United States Patent [19]
Schröder et al.

[11] Patent Number: 6,048,969
[45] Date of Patent: Apr. 11, 2000

[54] CATIONIC SULFONIC ACID DYES

[75] Inventors: Gunter-Rudolf Schröder, Mannheim; Udo Mayer, Frankenthal; Rainer Tresch, Maxdorf, all of Germany

[73] Assignee: BASF Aktiengesellschaft, Ludwigshafen, Germany

[21] Appl. No.: 09/287,559

[22] Filed: Apr. 6, 1999

[30] Foreign Application Priority Data

Apr. 9, 1998 [DE] Germany .................. 198 15 945

[51] Int. Cl.$^7$ .................. C09B 44/02; D06P 1/08
[52] U.S. Cl. .................. 534/614; 534/603; 534/605; 8/654; 8/919
[58] Field of Search .................. 534/614

[56] References Cited

U.S. PATENT DOCUMENTS

| | | | |
|---|---|---|---|
| 4,206,144 | 6/1980 | Jeffries et al. | 562/84 |
| 4,652,632 | 3/1987 | Colberg | 534/728 |
| 4,656,256 | 4/1987 | Colberg et al. | 534/256 |
| 4,694,075 | 9/1987 | Colberg et al. | 534/604 |

FOREIGN PATENT DOCUMENTS

| | | |
|---|---|---|
| 0 159 549 | 10/1985 | European Pat. Off. . |
| 0 162 409 | 11/1985 | European Pat. Off. . |

*Primary Examiner*—Fiona T. Powers
*Attorney, Agent, or Firm*—Oblon, Spivak, McClelland, Maier & Neustadt, P.C.

[57] ABSTRACT

Cationic sulfonic acid dyes of the formula I

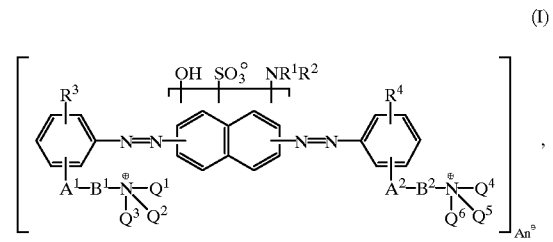

(I)

where the variables are as defined in the specification, are useful for the dyeing or printing of polymeric material.

9 Claims, No Drawings

CATIONIC SULFONIC ACID DYES

The present invention relates to compounds of the formula I

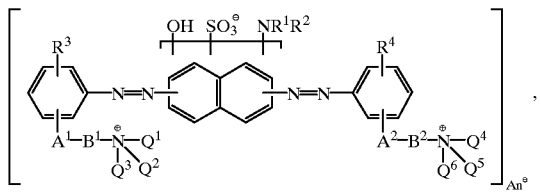

(I)

where
- $A^1$ and $A^2$ independently of one another are oxy, carbonyl, carbonyloxy, carbonylimino, iminocarbonyl, carbonyl-$(C_1-C_4)$-alkylimino or $(C_1-C_4)$-alkyliminocarbonyl,
- $B^1$ and $B^2$ independently of one another are $C_1-C_6$-alkylene which can be interrupted by 1 or 2 nonadjacent oxy, imino and unsubstituted or hydroxyl- or methoxy-substituted $C_1-C_4$-alkylimino groups,
- $R^1$ is hydrogen or is $C_1-C_4$-alkyl which is unsubstituted or substituted by hydroxyl, methoxy, chloro or phenyl,
- $R^2$ is hydrogen or $C_1-C_4$-alkyl or $R^1$ and $R^2$, together with the nitrogen atom connecting them, are a 5- or 6-membered saturated heterocyclic radical with or without nitrogen or oxygen as a further heteroatom,
- $R^3$ and $R^4$ independently of one another are hydrogen, $C_1-C_4$-alkyl which is unsubstituted or substituted by hydroxyl, halo or methoxy, or are halo, nitro or $C_1-C_4$-alkoxy,
- $Q^1$, $Q^2$, $Q^3$, $Q^4$, $Q^5$ and $Q^6$ independently of one another are hydrogen, or are $C_1-C_{10}$-alkyl which can be interrupted by from 1 to 4 nonadjacent oxy, imino and unsubstituted or hydroxyl- or methoxy-substituted $C_1-C_4$-alkylimino groups and can be substituted by hydroxyl, halo or phenyl, or $Q^1$ and $Q^2$, and $Q^4$ and $Q^5$, in each case together with the nitrogen atom connecting them, are a 5- or 6-membered heterocyclic radical with or without nitrogen or oxygen as a further heteroatom, and
- $An^\ominus$ is the equivalent of an anion, and to their use for dyeing or printing polymeric material.

EP-A-159 549 teaches monoazo dyes formed from α-naphthol and aminobenzoic acid ammonium alkyl esters.

EP-A-162 409, furthermore, discloses bisazo dyes with aminobenzoic acid ammonium alkyl esters as diazo component and resorcinol as coupling component.

US-A-4,206,144 describes bisazo dyes with aminohydroxynaphthalenesulfonic acids as coupling components and N,N-dimethyl-N-(3-aminomethoxybenzyl)-N-3-aminopropylammonium chloride as diazo component.

It is an object of the present invention to provide new cationic sulfonic acid dyes. The novel dyes should advantageously be suitable for dyeing or printing polymeric material, especially paper, and the dyeings obtained with them should have good service properties.

We have found that this object is achieved by the dyes of the formula I detailed at the outset.

All of the alkyl or alkylene groups appearing in the abovementioned formula can be either straight-chain or branched.

Where radicals $R^1$ and $R^2$, $Q^1$ and $Q^2$ or $Q^4$ and $Q^5$, together with the nitrogen atom connecting them, are a 5- or 6-membered saturated heterocyclic radical with or without nitrogen or oxygen as a further heteroatom, suitable radicals can be pyrrolidinyl, piperidinyl, morpholinyl or piperazinyl, which can be substituted on the nitrogen by methyl, ethyl, n- and iso-propyl, n-, iso- or sec-butyl, 2-hydroxyethyl, 2- or 3-hydroxypropyl.

Where the radicals $Q^1$ and $Q^2$ or $Q^4$ and $Q^5$, together with the nitrogen atom connecting them, are a 5- or 6-membered unsaturated heterocyclic radical with or without nitrogen or oxygen as a further heteroatom, suitable aromatic radicals can be pyrrolyl, pyrazolyl, oxazolyl, isoxazolyl or imidazolyl which can be substituted in position 2 and/or 4 by methyl, ethyl, propyl or butyl, or else N-3-$(C_1-C_4)$-alkylimidazolyl, which can be substituted in position 2 and/or 4 by methyl, ethyl, propyl or butyl, or else pyridinio, 2-methylpyridinio or 4-methylpyridinio.

Where the radicals $A^1$ and $A^2$ are carbonyloxy or its amino derivatives, the carbonyl group is attached to the phenyl ring; in other words, the structures are derivatives of benzoic acid.

Halo is fluoro, chloro or bromo.

Where substituted alkyl radicals appear in the above-named formula they are generally mono- or disubstituted.

Radicals $R^1$, $R^2$, $R^3$, $R^4$, $Q^1$, $Q^2$, $Q^3$, $Q^4$, $Q^5$ and $Q^6$ are, for example, methyl, ethyl, propyl, isopropyl, butyl, isobutyl, sec-butyl or tert-butyl.

Radicals $Q^1$, $Q^2$, $Q^3$, $Q^4$, $Q^5$ and $Q^6$ are additionally, for example, pentyl, isopentyl, neopentyl, tert-pentyl, hexyl, 2-methylpentyl, heptyl, octyl, 2-ethylhexyl, isooctyl, nonyl, isononyl or decyl (the designations isooctyl, isononyl and isodecyl above are trivial names deriving from the alcohols obtained by oxo synthesis—cf. in this regard Ullmanns Encyklopadie der technischen Chemie, 4th Edition, Volume 7, pages 215 to 217, and Volume 11, pages 435 and 436).

Radicals $R^1$, $R^3$, $R^4$, $Q^1$, $Q^2$, $Q^3$, $Q^4$, $Q^5$ and $Q^6$ are additionally, for example, 2-hydroxyethyl, 2- or 3-hydroxypropyl, 2- or 4-hydroxybutyl, 2-methoxyethyl, 2- or 3-methoxypropyl, 2- or 4-methoxybutyl, 2-chloroethyl, 2- or 3-chloropropyl or 2- or 4-chlorobutyl. Radicals $R^1$, $Q^1$, $Q^2$, $Q^3$, $Q^4$, $Q^5$ and $Q^6$ are additionally, for example, benzyl or 1- or 2-phenylethyl.

Radicals $R^3$ and $R^4$ are additionally, for example, methoxy, ethoxy, propoxy, isopropoxy, butoxy, isobutoxy or tert-butoxy.

Radicals $Q^1$, $Q^2$, $Q^3$, $Q^4$, $Q^5$ and $Q^6$ are additionally, for example, 2-methoxyethyl, 2-ethoxyethyl, 2-propoxyethyl, 2-isopropoxyethyl, 2-butoxyethyl, 2- or 3-methoxypropyl, 2- or 3-ethoxypropyl, 2- or 3-propoxypropyl, 2- or 3-butoxypropyl, 2- or 4-methoxybutyl, 2- or 4-ethoxybutyl, 2- or 4-propoxybutyl, 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl, 2- or 4-butoxybutyl, 4,8-dioxadecyl, 3,6,9-trioxadecyl, 3,6,9-trioxaundecyl, 3,6,9-trioxadodecyl, 3,6,9,12-tetraoxatridecyl, 3,6,9,12-tetraoxatetradecyl, 4-hydroxy- 2-methyl-3-azabutyl, 4-hydroxy-3-hydroxymethyl-2-methyl-3-azabutyl, 5-hydroxy-2-methyl-3-azapentyl, 5-hydroxy-3-(2-hydroxyethyl)-2-methyl-3-azapentyl, 8-hydroxy-2-methyl-3-aza-6-oxaoctyl, 11-hydroxy-2-methyl-3-aza-6,9-dioxaundecyl, 8-hydroxy-3-(5-hydroxy-3-oxapentyl)-2-methyl-3-aza-6-oxaoctyl or 11-hydroxy-3-(8-hydroxy-3,6-dioxaoctyl)-2-methyl-3-aza-6,9-dioxaundecyl, N,N-dimethylaminoethyl, N,N-diethylaminoethyl, N,N-dipropylaminoethyl, N,N-dibutylaminoethyl, 3-(N,N-dimethylamino)propyl, 3-(N,N-diethylamino)propyl, 3-(N,N-dipropylamino)propyl or 3-(N,N-dibutylamino)propyl.

Radicals $A^1$ and $A^2$ are, for example, carbonyl-N-methylimino, carbonyl-N-ethylimino, carbonyl-N-propylimino and carbonyl-N-butylimino.

Radicals $B^1$ and $B^2$ are, for example, methylene, ethylene, 1,2- or 1,3-propylene, 1,2-, 2,3- or 1,4-butylene, $(CH_2)_2O(CH_2)_2$, $(CH_2)_3O(CH_2)_2$, $(CH_2)_3O(CH_2)_3$, $(CH_2)_2O(CH_2)_2O(CH_2)_2$, $(CH_2)_2NH(CH_2)_2$, $(CH_2)_3NH(CH_2)_2$, $(CH_2)_3NH(CH_2)_3$ or $(CH_2)_2NH(CH_2)_2NH(CH_2)_2$,

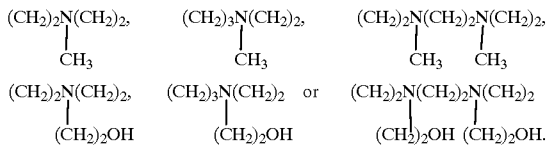

The equivalent $An^\ominus$ of an anion is derived, for example, from the following anions: fluoride, chloride, bromide, iodide, formate, acetate, propionate, mono-, di- or trichloracetate, lactate, methoxyacetate, citrate, succinate, methanesulfonate, benzenesulfonate, 2- or 4-methylbenzenesulfonate or naphthalenesulfonate.

Preference is given to cationic sulfonic acid dyes of the formula I in which $A^1$ and $A^2$ independently of one another are oxy and especially are carbonyl, carbonyloxy or carbonylimino.

Preference is also given to those dyes in which $B^1$ and $B^2$ independently of one another are $C_2$–$C_6$-alkylene which can be interrupted by oxy or methylimino. $C_2$–$C_4$-alkylene, which can be interrupted by oxy or methylimino, is particularly preferred.

Likewise preferred are dyes of the formula I in which $R^1$ and $R^2$ are hydrogen.

Preference extends to dyes of the formula I in which $Q^1$ and $Q^4$ are hydrogen. Dyes in which $Q^1$, $Q^2$, $Q^3$, $Q^4$, $Q^5$ and $Q^6$ independently of one another are hydrogen or $C_1$–$C_4$-alkyl are likewise preferred. Particular preference is given to those dyes in which $Q^1$ and $Q^4$ are hydrogen and $Q^2$, $Q^3$, $Q^5$ and $Q^6$ independently of one another are $C_1$–$C_4$-alkyl.

Furthermore, dyes are preferred in which the diazo component is doubly coupled, in other words those of the formula II

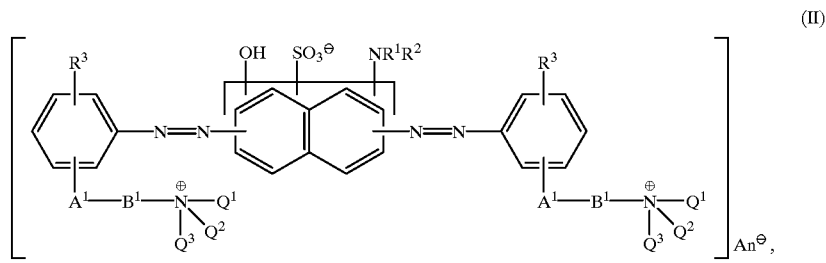

(II)

where
$A^1$, $B^1$, $R^1$, $R^2$, $R^3$, $Q^1$, $Q^2$, $Q^3$ and $An^\ominus$ are as defined above.

Preference is given, furthermore, to cationic acid dyes of the formula I which are based on 1-hydroxy-8-aminonaphthalene-5-sulfonic acid, 1-hydroxy-7-aminonaphthalene-3-sulfonic acid, 1-hydroxy-5-aminonaphthalene-3-sulfonic acid and, with particular preference, 1-hydroxy-6-aminonaphthalene-3-sulfonic acid and 1-hydroxy-6-methylaminonaphthalene-3-sulfonic acid as coupling components.

Particular preference is given to dyes of the formula III

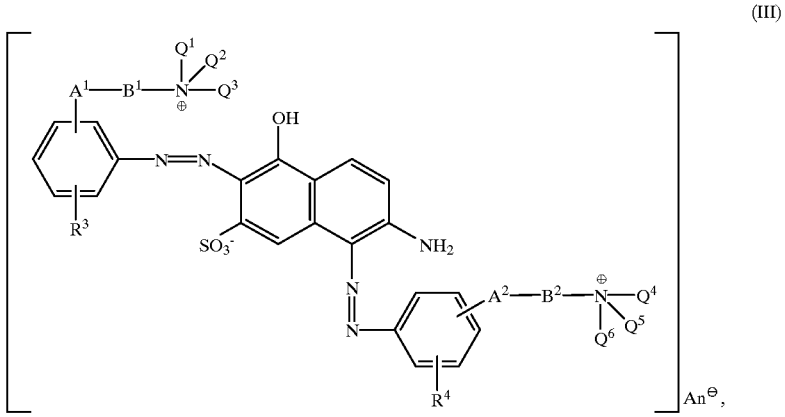

where $A^1, A^2, B^1, B^2, R^3_1, R^4, Q^1, Q^2, Q^3, Q^4, Q^5, Q6$ and $An^{\ominus}$ are as defined above and, of these, a special preference to those in which the radicals $A^1$, Bs, $Q^1, Q^2, Q^3$ and $R^3$ are in each case identical with the corresponding radicals $A^2, B^2, Q^4, Q^5, Q^6$ and $R^4$.

Further preference is given to dyes of the formulae I, II and III in which $A^1$ and $A^2$ are ortho to the diazo bridge.

Very particular preference is given to dyes of the formula I in which $A^1$ and $A^2$ independently of one another are oxy, carbonyl, carbonyloxy or carbonylimino, $B^1$ and $B^2$ independently of one another are $C_2$–$C_4$-alkylene which can be interrupted by oxy or methylimino, $R^1$ and $R^2$ are hydrogen, and $Q^1, Q^2, Q^3$, Q4, $Q^5$ and $Q^6$ independently of one another are hydrogen or $C_1$–$C_4$-alkyl.

The novel dyes can be obtained by conventional methods. To prepare compounds of the formula I it is possible to diazotize amines of the formula IV

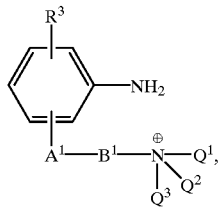

(IV)

and react the products with a coupling component of the formula V

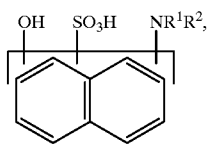

(V)

in the weakly acid to neutral pH range, generally from 3 to 5. To prepare dyes having two different diazo components, the poor water-solubility of the monoazo dye in the acidic pH range, i.e. from 1 to 2, is utilized and it is isolated before being reacted with another diazo component at a pH of between 3 and 7 to give the bisazo dye. It is of course also possible to employ the two-stage process for twofold coupling with the same diazo component, but there is generally no advantage in doing so. Said dyes are prepared simply by coupling with twice the amount of amines.

It is also possible first to prepare the unquaternized bisazo dye and then to quaternize it with a $C_2$–$C_4$-alkylene oxide or with a compound of the formula VI $$Q^3-Y \qquad (VI),$$

where $Q^3$ is unsubstituted or hydroxyl-substituted $C_1$–$C_4$-alkyl and Y is a leaving group such as chloride, bromide, iodide, methosulfate, ethosulfate, benzenesulfonate or 2- or 4-methylbenzenesulfonate.

The amines of the formula IV are widely known and are described in EP-A-162 409 and US-A-4,206,144

The basic azo dyes of the formula I according to the invention can be employed alone, in mixtures with one another, and together with other cationic or anionic compounds, in the form of their solutions or in the form of powders or granules. They are advantageously suitable for dyeing or printing polymeric material, especially paper pulps, but also cellulose, cotton, leather, bast fibers, hemp, flax, sisal, jute, coir or straw. They are suitable for use as dyes in recording fluids such as inks and in the inkjet method, but especially for mass dyeings of paper.

In preparing dye preparations comprising the novel dyes of the formula I emphasis is to be given to the use of polymers such as polyacrylic acids, polyacrylic acid derivatives, polyvinylamines, polyvinylamides, polyvinyl acetates, polyvinyl alcohols, polyvinylpyrrolidones, polysiloxanes or copolymers of the respective monomers. Use may likewise be made of oligomers of ethylenimine, ethylene oxide or propylene oxide, or derivatives of these oligomers.

The dyes can be used with preference in the production of pulp-dyed sized and unsized paper. They can likewise be employed for dyeing paper by the dipping technique.

The dyeing of paper, leather or cellulose takes place in accordance with methods which are known per se.

The novel dyes or their preparations impart little or no color to the papermaking waste water, which is particularly favorable in terms of avoiding waterway pollution. They are highly substantive, do not marble when applied to paper, and are substantially pH-insensitive. The dyeings on paper are notable for good lightfastness. On prolonged exposure to light the shade changes on-tone.

The dyed paper, which is readily bleachable, is wet-fast, not only to water but also to milk, soapy water, sodium chloride solutions, fruit juices or sweetened mineral water, and, owing to its good alcohol fastness, is also fast to alcoholic beverages.

The novel dyes can also be used for dyeing, padding or printing polyacrylonitrile textiles or anionically modified polyamide or polyester textiles.

The following examples are intended to illustrate the invention.

EXAMPLE 1 a) 5.2 g (25 mmol) of 2-(N,N-dimethylamino)ethyl anthranilate were dissolved in 50 ml of water with addition of 25 ml of 5-molar hydrochloric acid, and 50 g of ice were added. Diazotization was then carried out with 8 ml of a 3.33-molar sodium nitrite solution for 45 minutes at a temperature between 0 and 5° C. The excess nitrite was then removed with about 0.5 g of sulfamic acid, and a pH of 2 was established with sodium hydrogen carbonate.

In a separate reaction vessel, 6.44 g (25 mmol) of 6-amino-1-naphthol-3-sulfonic acid (J acid) were dissolved in 100 ml of water by using 50% strength by weight sodium hydroxide solution to establish a pH of from 6 to 7.

This solution was added dropwise at 10° C. over 30 minutes to the diazonium salt solution described earlier. The mixture was then stirred overnight, during which it warmed up to room temperature. Throughout the dropwise addition of the coupling component and the overnight stirring, the pH was held at 2 with sodium acetate. The crystalline precipitate was filtered off, washed with water and dried, thus giving 10.8 g (94% of theory) of the monoazo dye of the formula

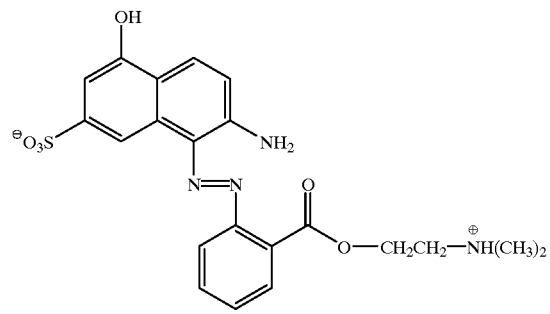

$\lambda_{max}$: 490 nm; abs./g: 30.1 (N-methylpyrrolidone)

$^1$H-NMR (DMSO-$d_6$): 2.9 ppm (2s, 6H, $CH_3$), 3.6 (m, 2H, $CH_2$), 4.6 (m, 2H, $CH_2$), 7.0–8.4 (several s, d, m, 8H, Ar-H), Elemental analysis: calc.: C: 54.9 H: 4.7 N: 12.2 O: 20.9 S: 7.0; found: C: 52.8 H: 5.0 N: 11.6 O: 24.2 S: 6.9; $C_{21}H_{22}N_4O_6S$ (458.5)

b) 5.2 g (25 mmol) of 2-(N,N-dimethylamino)ethyl anthranilate were dissolved in 50 ml of water with addition of 25 ml of 5-molar hydrochloric acid, and 50 g of ice were added. Diazotization was then carried out with 8 ml of a 3.33-molar sodium nitrite solution for 45 minutes at a temperature between 0 and 5° C. The excess nitrite was then destroyed with about 0.2–0.5 g of sulfamic acid. A suspension consisting of 47 g (25 mmol; dry weight 10.8 g) of the monoazo dye prepared under a) in 100 ml of water and 45 g of acetic acid was added to the ice-cold diazonium solution thus prepared. The pH was then set to 4 or with sodium carbonate and the mixture was stirred overnight, during which it warmed up to room temperature. The crystallized solid was isolated, washed with water and dried, giving 12.5 g (74% of theory) of a dye of the formula

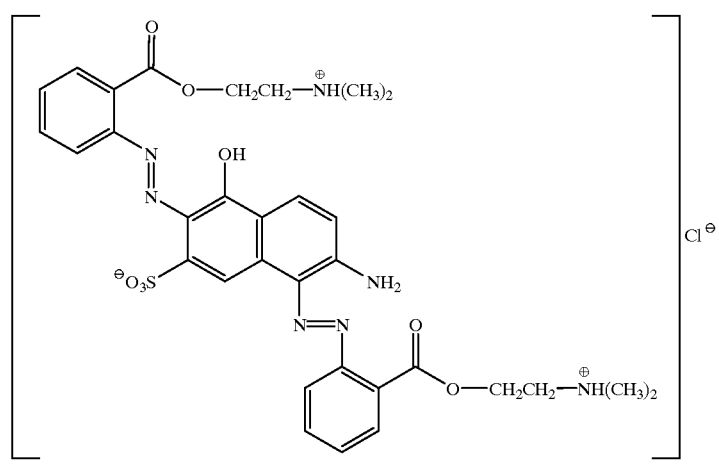

$\lambda_{max}$: 498 nm; abs./g: 51.3 (30% strength acetic acid)

$^1$H-NMR (DMSO-d$_6$): 2.8 ppm (2s, 12H, CH$_3$), 3.5 (m, 2H, CH$_2$), 3.6 (m, 2H, CH$_2$), 4.6 (m, 2H, CH$_2$), 4.75 (m, 2H, CH$_2$), 7.0–8.7 (several s, d, m, 11 H, Ar-H)

This dye was soluble in an acetic acid/water mixture and was useful for producing paper having a wet-fast scarlet color. Even when dyeing chemical paper grades only slight wastewater staining was observed.

EXAMPLE 2

8 ml of a 3.33-molar sodium nitrite solution were added at from 5 to 10° C. to a solution of 6.3 g (25 mmol) of 2-(2-N,N-dimethyl-aminoethoxy)ethyl anthranilate in 7.58 g of hydrochloric acid and 15 g of acetic acid. The excess nitrite was then removed with about 0.5 g of sulfamic acid. After 30 minutes of subsequent stirring, 6.44 g (25 mmol) of 6-amino-1-naphthol-3-sulfonic acid (J acid) were added to the diazonium salt solution. A pH of 4 was set with about 10 ml of a 20% strength by weight aqueous sodium hydroxide solution, and stirring was carried out for 1 hour.

In a separate reaction vessel, 5.73 g (27.5 mmol) of 2-(N,N-dimethylamino)ethyl anthranilate were dissolved in 8.3 g of concentrated hydrochloric acid and 16.5 g of acetic acid, and 8.8 ml of a 3.33-molar sodium nitrite solution were added at about 10° C. The mixture was stirred for 45 minutes at a temperature between 0 and 5° C. and then the excess nitrite was destroyed with about 0.2–0.5 g of sulfamic acid. This solution was added to the above-described coupling solution. A pH of 3 to 4 was established with about 20 ml of 20% strength by weight aqueous sodium hydroxide solution. The mixture was stirred first for 2 h at 10° C. and then overnight at room temperature. Adding 90 g of acetic acid gave an approximately 9% strength by weight solution of the dye This dye solution was useful for producing paper with a wet-fast scarlet color, and had high affinity to chemical paper

EXAMPLE 3

33.5 g (53 mmol) of 2-(2-(N,N-dimethylamino)ethoxy) ethyl anthranilate were dissolved in a mixture of 15.9 g of concentrated hydrochloric acid and 5.25 g of acetic acid. 16.8 ml of 3.33-molar sodium nitrite solution were added at 10 to 15° C., and the mixture was stirred for 30 minutes. The excess nitrite was then removed with from about 0.2 to 0.5 g of sulfamic acid. 6.44 g (25 mol) of J acid were scattered into the resultant ice-cold diazonium salt solution. A pH of 4 was established with about 15 ml of 20% strength aqueous sodium hydroxide solution. After about 1 hour the coupling reaction was at an end. This gave an approximately 17% strength by weight solution of the dye of the structural formula

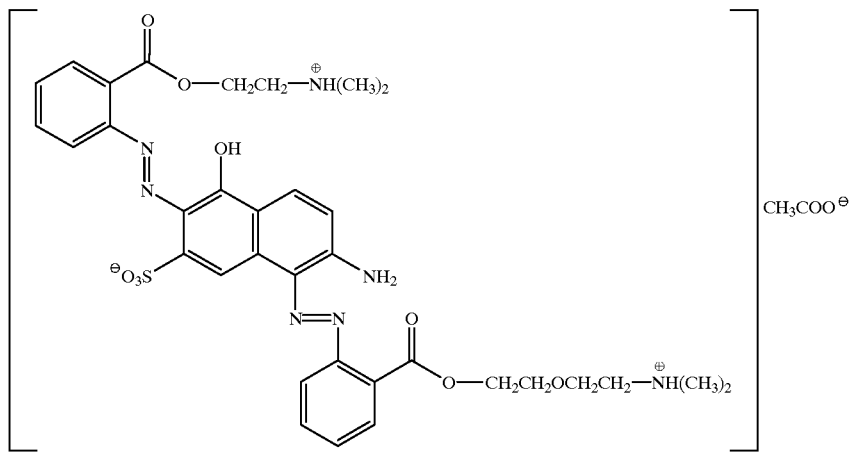

($\lambda_{max}$: 490 nm; abs./g: 4.07, methanol: acetic acid=9:1).

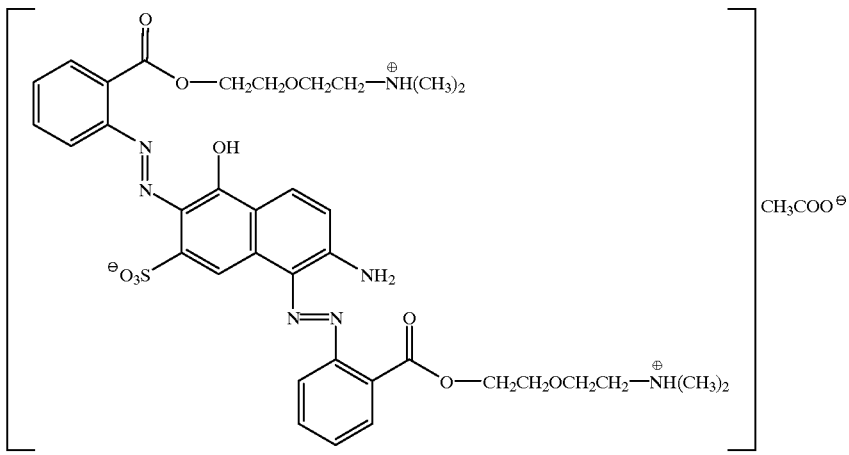

$\lambda_{max}$: 498 nm abs./g: 9.306, methanol: acetic acid=9:1).

The dyes of Examples listed in Table 1 were obtained by methods similar to those of Examples 1, 2 and 3. The absorption maxima $\lambda_{max}$ were determined in 30% strength by weight acetic acid.

TABLE 1

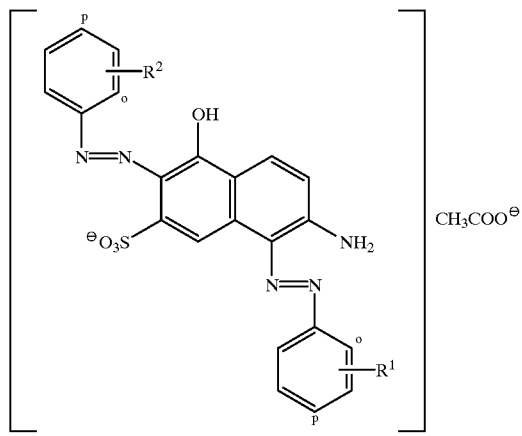

o and p denote the ortho or para site of attachment of R1 and R2 respectively.

| Ex. | $R^1$ | $R^2$ | $\lambda_{max}$ [nm] |
|---|---|---|---|
| 4 | o-$(OC_2H_4N^+H(CH_3)_2)$ | o-$(COOC_2H_4N^+H(CH_3)_2)$ | 502 |
| 5 | o-$(COOC_2H_4N^+H(CH_3)_2)$ | o-$(COOC_2H_4N^+H(CH_3)_2)$ | 498 |
| 6 | o-$(COOC_2H_4N^+H(CH_3)_2)$ | p-$(COOC_2H_4N^+H(CH_3)_2)$ | 498 |
| 7 | o-$(COOC_2H_4N^+H(CH_3)_2)$ | o-$(COOC_3H_6N^+H(CH_3)_2)$ | 496 |
| 8 | o-$(COOC_2H_4N^+H(CH_3)_2)$ | o-$(COOC_2H_4O-C_2H_4N^+H(CH_3)_2)$ | 500 |
| 9 | o-$(COOC_2H_4N^+H(CH_3)_2)$ | o-$(COOC_2H_4N^+(CH_3)_3)$ | 492 |
| 10 | o-$(COOC_2H_4N^+H(CH_3)_2)$ | o-$(COOC_2H_4N(CH_3)-C_2H_4N^+H(CH_3)_2)$ | 491 |
| 11 | p-$(COOC_2H_4N^+H(CH_3)_2)$ | p-$(COOC_2H_4N^+H(CH_3)_2)$ | 490 |
| 12 | p-$(COOC_2H_4N^+H(CH_3)_2)$ | o-$(COOC_2H_4N^+H(CH_3)_2)$ | 494 |
| 13 | p-$(COOC_2H_4N^+H(CH_3)_2)$ | o-$(COOC_3H_6N^+H(CH_3)_2)$ | 491 |
| 14 | p-$(COOC_2H_4N^+H(CH_3)_2)$ | o-$(COOC_2H_4O-C_2H_4N^+H(CH_3)_2)$ | 489 |
| 15 | p-$(COOC_2H_4N^+H(CH_3)_2)$ | o-$(COOC_2H_4N^+(CH_3)_3)$ | 495 |
| 16 | p-$(COOC_2H_4N^+H(CH_3)_2)$ | o-$(COOC_2H_4N^+H(i-C_3H_7)_2)$ | 486 |
| 17 | o-$(COOC_3H_6N^+H(CH_3)_2)$ | o-$(COOC_3H_6N^+H(CH_3)_2)$ | 493 |
| 18 | o-$(COOC_3H_6N^+H(CH_3)_2)$ | o-$(COOC_2H_4N^+H(CH_3)_2)$ | 490 |
| 19 | o-$(COOC_3H_6N^+H(CH_3)_2)$ | p-$(COOC_2H_4N^+H(CH_3)_2)$ | 492 |
| 20 | p-$(COOC_3H_6N^+H(CH_3)_2)$ | p-$(COOC_3H_6N^+H(CH_3)_2)$ | 494 |
| 21 | o-$(COOC_2H_4N^+(CH_3)_3)$ | o-$(COOC_2H_4N^+(CH_3)_3)$ | 504 |
| 22 | o-$(COOC_2H_4N^+(CH_3)_3)$ | p-$(COOC_2H_4N^+H(CH_3)_2)$ | 496 |
| 23 | o-$(COOC_2H_4N^+(CH_3)_3)$ | o-$(COOC_2H_4O-C_2H_4N^+H(CH_3)_2)$ | 502 |
| 24 | p-$(COOC_2H_4N^+(CH_3)_3)$ | p-$(COOC_2H_4N^+(CH_3)_3)$ | 504 |

TABLE 1-continued

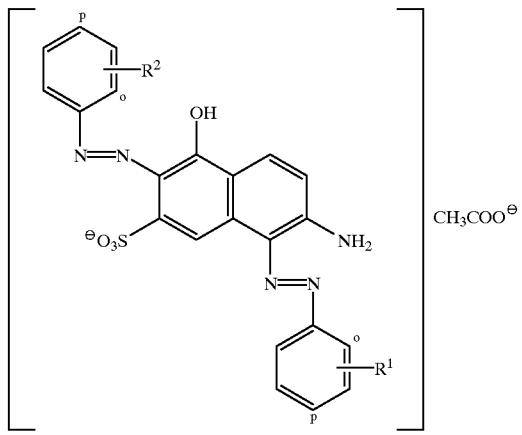

o and p denote the ortho or para site of attachment of R1 and R2 respectively.

| Ex. | $R^1$ | $R^2$ | $\lambda_{max}$ [nm] |
|---|---|---|---|
| 25 | o-(CONHC$_2$H$_4$N$^+$H(CH$_3$)$_2$) | o-(CONHC$_2$H$_4$N$^+$H(CH$_3$)$_2$) | 490 |
| 26 | o-(CONHC$_3$H$_7$N$^+$H(CH$_3$)$_2$) | o-(CONHC$_3$H$_7$N$^+$H(CH$_3$)$_2$) | 492 |
| 27 | p-(COCH$_2$N$^+$(CH$_3$)$_3$) | p-(COCH$_2$N$^+$(CH$_3$)$_3$) | 499 |
| 28 | p-(COCH$_2$N$^+$(CH$_3$)$_3$) | p-(COOC$_2$H$_4$N$^+$H(CH$_3$)$_2$) | 496 |
| 29 | p-(COCH$_2$N$^+$(CH$_3$)$_3$) | o-(COOC$_2$H$_4$N$^+$H(CH$_3$)$_2$) | 496 |
| 30 | o-(COOC$_2$H$_4$N$^+$H(i-C$_3$H$_7$)$_2$) | o-(COOC$_2$H$_4$N$^+$H(i-C$_3$H$_7$)$_2$) | 491 |
| 31 | o-(COOC$_2$H$_4$N$^+$H(i-C$_3$H$_7$)$_2$) | o-(COOC$_2$H$_4$N$^+$H(CH$_3$)$_2$) | 492 |
| 32 | o-(COOC$_2$H$_4$N$^+$H(i-C$_3$H$_7$)$_2$) | p-(COOC$_2$H$_4$N$^+$H(CH$_3$)$_2$) | 492 |
| 33 | o-(COOC$_2$H$_4$O—C$_2$H$_4$N$^+$H(CH$_3$)$_2$) | o-(COOC$_2$H$_4$N$^+$H(CH$_3$)$_2$) | 490 |
| 34 | o-(COOC$_2$H$_4$O—C$_2$H$_4$N$^+$H(CH$_3$)$_2$) | p-(COOC$_2$H$_4$N$^+$H(CH$_3$)$_2$) | 492 |
| 35 | o-(COOC$_2$H$_4$O—C$_2$H$_4$N$^+$H(CH$_3$)$_2$) | o-(COOC$_2$H$_4$N(CH$_3$)—C$_2$H$_4$N$^+$H(CH$_3$)$_2$) | 490 |
| 36 | o-(COOC$_2$H$_4$N(CH$_3$)—C$_2$H$_4$N$^+$H(CH$_3$)$_2$) | o-(COOC$_2$H$_4$N(CH$_3$)—C$_2$H$_4$N$^+$H(CH$_3$)$_2$) | 490 |
| 37 | o-(COOC$_2$H$_4$N(CH$_3$)—C$_2$H$_4$N$^+$H(CH$_3$)$_2$) | o-(COOC$_2$H$_4$N$^+$H(CH$_3$)$_2$) | 490 |
| 38 | o-(COOC$_2$H$_4$N(CH$_3$)—C$_2$H$_4$N$^+$H(CH$_3$)$_2$) | o-(COOC$_2$H$_4$O—C$_2$H$_4$N$^+$H(CH$_3$)$_2$) | 490 |
| 39 | o-(COOC$_2$H$_4$N(CH$_3$)—C$_2$H$_4$N$^+$H(CH$_3$)$_2$) | p-(COCH$_2$N$^+$(CH$_3$)$_3$) | 498 |
| 40 | o-(OC$_2$H$_4$N$^+$H(CH$_3$)$_2$) | o-(OC$_2$H$_4$N$^+$H(CH$_3$)$_2$) | 512 |

The following were also prepared by similar methods:

EXAMPLE 41

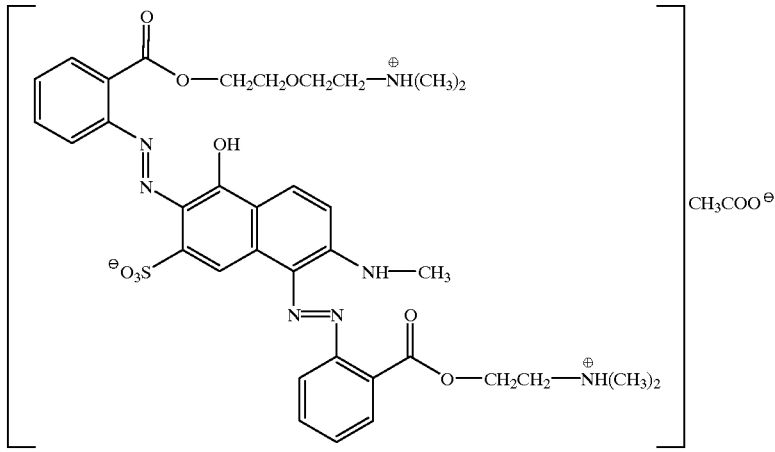

$\lambda_{max}$=505 nm

EXAMPLE 42

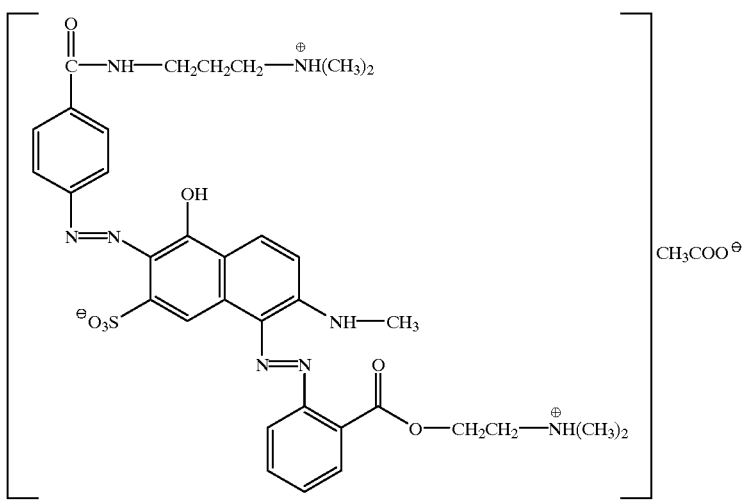

$\lambda_{max}$=510 nm

We claim:

1. A cationic sulfonic acid dye of the formula I

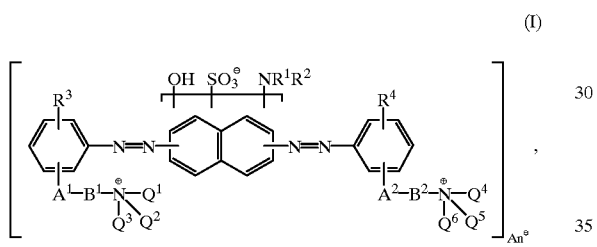

where

A$^1$ and A$^2$ independently of one another are oxy, carbonyl, carbonyloxy, carbonylimino, iminocarbonyl, carbonyl-(C$_1$–C$_4$)-alkylimino or (C$_1$–C$_4$)-alkyliminocarbonyl, B$^1$ and B$^2$ independently of one another are C$_1$–C$_6$-alkylene which may be interrupted by 1 or 2 nonadjacent oxy, imino and unsubstituted or hydroxyl- or methoxy-substituted C$_1$–C$_4$-alkylimino groups, R$^1$ is hydrogen or is C$_1$–C$_4$-alkyl which is unsubstituted or substituted by hydroxyl, methoxy, chloro or phenyl, R$^2$ is hydrogen or C$_1$–C$_4$-alkyl or R$^1$ and R$^2$, together with the nitrogen atom connecting them, are a 5- or 6-membered saturated heterocyclic radical with or without nitrogen or oxygen as a further heteroatom, R$^3$ and R$^4$ independently of one another are hydrogen, C$_1$–C$_4$-alkyl which is unsubstituted or substituted by hydroxyl, halo or methoxy, or are halo, nitro or C$_1$–C$_4$-alkoxy, Q$^1$, Q$^2$, Q$^3$, Q$^4$, Q$^5$ and Q$^6$ independently of one another are hydrogen, or are C$_1$–C$_{10}$-alkyl which may be interrupted by from 1 to 4 nonadjacent oxy, imino and unsubstituted or hydroxyl- or methoxy-substituted C$_1$–C$_4$-alkylimino groups and can be substituted by hydroxyl, halo or phenyl, or Q$^1$ and Q$^2$, and Q$^4$ and Q$^5$, in each case together with the nitrogen atom connecting them, are a 5- or 6-membered heterocyclic radical with or without nitrogen or oxygen as a further heteroatom, and An$^\ominus$ is the equivalent of an anion.

2. A dye as claimed in claim 1, wherein A$^1$ and A$^2$ independently of one another are oxy, carbonyl, carbonyloxy or carbonylimino.

3. A dye as claimed in claim 1, wherein B$^1$ and B$^2$ independently of one another are C$_2$–C$_6$-alkylene which may be interrupted by oxy or methylimino.

4. A dye as claimed in claim 1, wherein R$^1$ and R$^2$ are hydrogen.

5. A dye as claimed in claim 1, wherein Q$^1$ and Q$^4$ are hydrogen and Q$^2$, Q$^3$, Q$^5$ and Q$^6$ are C$_1$–C$_4$-alkyl.

6. A dye as claimed in claim 1 of the formula II

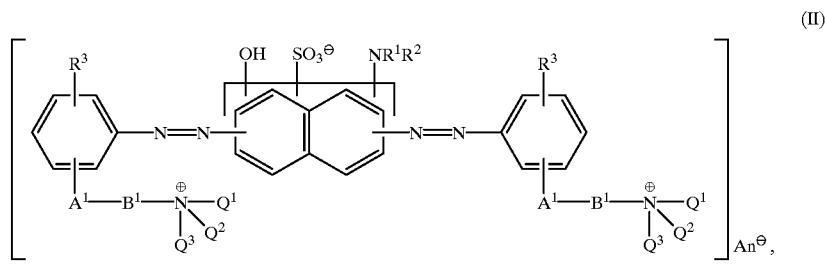

where

A$^1$, B$^1$, R$^1$, R$^2$, R$^3$, Q$^1$, Q$^2$, Q$^3$ and An$^\ominus$ are as defined in claim 1.

7. A dye as claimed in claim 1 of the formula III
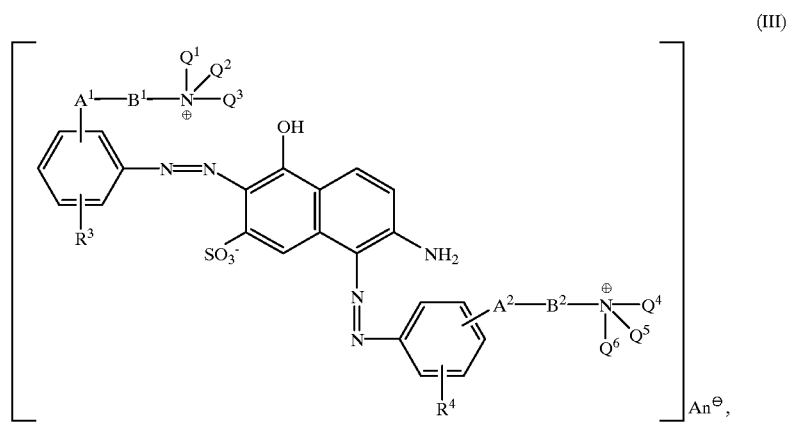
where
$A^1$, $A^2$, $B^1$, $B^2$, $R^3$, $R^4$, $Q^1$, $Q^2$, $Q^3$, $Q^4$, $Q^5$, $Q^6$ and $An^\ominus$ are as defined in claim 1.
8. A dye as claimed in claim 1, wherein $A^1$ and $A^2$ are ortho to the diazo bridge.
9. A method of dyeing or printing polymeric material comprising applying thereto a dye as claimed in claim 1.
* * * * *